United States Patent
Schrieken

[11] 3,880,549
[45] Apr. 29, 1975

[54] TURBINE

[75] Inventor: Jan Schrieken, Delden, Netherlands

[73] Assignee: Koninklijke Machinefabriek Stork, B.V., Hengels, Netherlands

[22] Filed: Nov. 19, 1973

[21] Appl. No.: 416,862

[52] U.S. Cl. ............... 415/95; 415/186; 415/219
[51] Int. Cl. ........ F01d 3/02; F01d 9/02; F01d 9/06
[58] Field of Search ............ 415/94, 101, 102, 103, 415/219, 200, DIG. 3, 93, 95, 108, 186, 189

[56] References Cited
UNITED STATES PATENTS

| 755,062 | 3/1904 | Shepherd | 415/95 |
|---|---|---|---|
| 1,154,648 | 9/1915 | Mellin | 415/186 |
| 1,283,088 | 11/1918 | Connor | 415/95 |
| 3,610,770 | 10/1971 | Hendriks | 415/103 |
| 3,773,431 | 11/1973 | Belatti et al. | 415/101 |

FOREIGN PATENTS OR APPLICATIONS

| 337,062 | 10/1930 | United Kingdom | 415/103 |
|---|---|---|---|
| 538,524 | 6/1922 | France | |

Primary Examiner—C. J. Husar
Assistant Examiner—Louis J. Casaregola
Attorney, Agent, or Firm—Snyder, Brown and Ramik

[57] ABSTRACT

A turbine in which at least the wheel of the first stage is traversed in a centripetal direction, and one or more distribution ducts being arranged around the centripetal wheel, one or more regulating valves being connected directly with the inlet side of the distribution duct(s), the horizontally divided turbine housing having secured in its interior the equally horizontally divided housing of the centripetal stage accommodating the distribution ducts, each of the halves of the turbine housing having secured to it a housing of a regulating valve and in each regulating valve the portion of the housing which determines the flow passage along the valve body being constructed to form a replaceable part.

16 Claims, 3 Drawing Figures

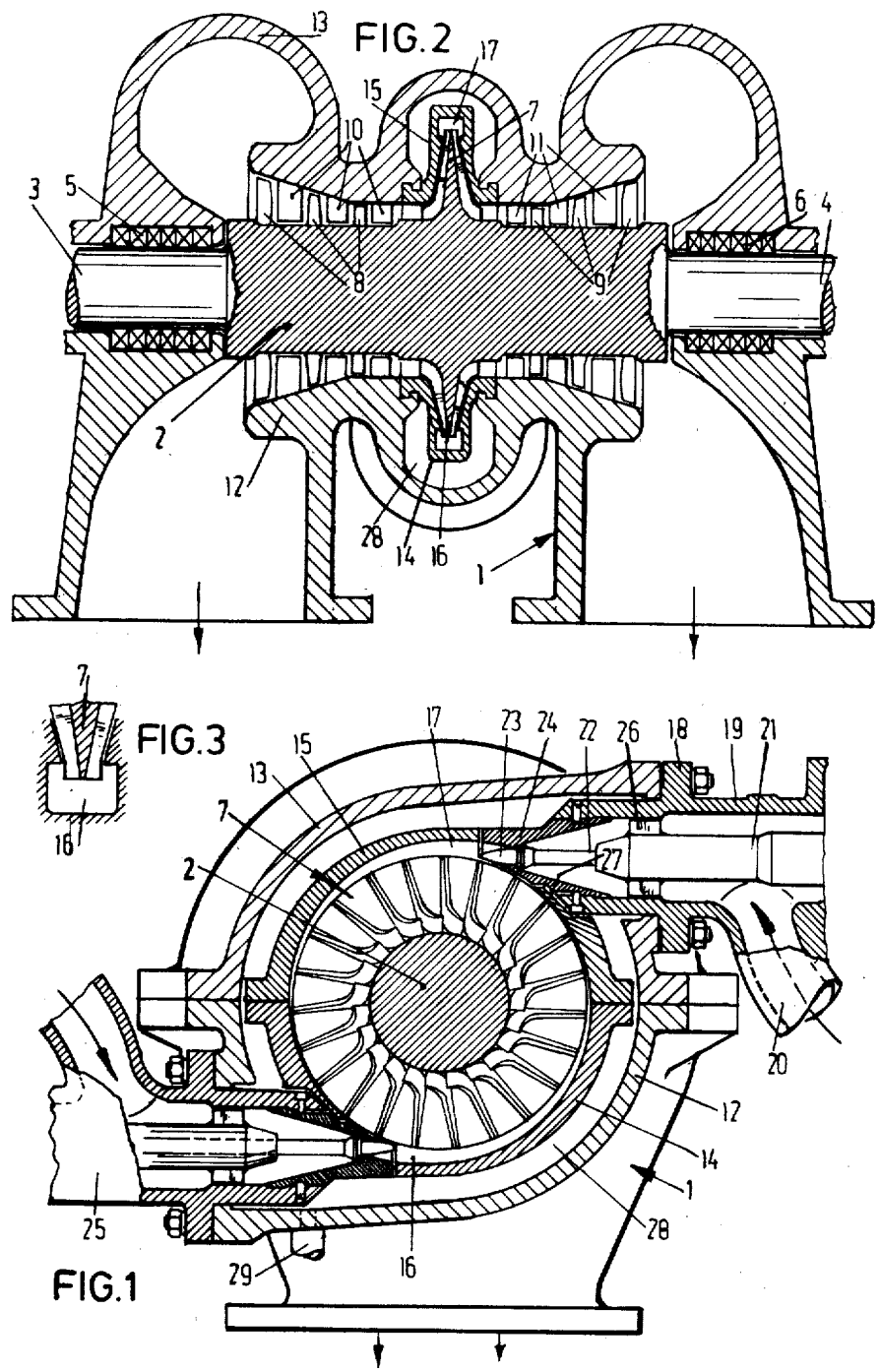

TURBINE

The invention relates to a turbine using a compressible medium and having one or more wheels, among which at least the wheel of the first stage is traversed in centripetal direction by the driving medium and operates in accordance with the equal-pressure principle, said stage being surrounded by one or more distribution ducts arranged around the centripetal wheel, whilst one or more regulating valves in which an enthalpy difference of the medium is converted into velocity is (are) connected directly with the inlet side of the distribution duct(s) and viewed from the inlet end the duct(s) exhibit(s) a gradually decreasing flow passage and join(s) along the whole inner circumference directly the centripetal wheel.

The invention has for its object to provide a similar turbine in which standardization can be readily carried into effect, which becomes manifest in the cost price. According to the invention the horizontally divided turbine housing has fastened in its interior the equally horizontally divided housing of the centripetal stage accomodating the distribution ducts, whilst each of the halves of the turbine housing has secured on it the housing of a regulating valve and in each regulating valve the housing portion determining the flow passage along the valve body is constructed in the form of a replaceable part. If in such a turbine design it is desired to use other inlet and outlet conditions and a different power the same turbine housing and the same valve housings with connections can be employed. It is only necessary to adapt the housing of the centripetal stage to the parts of the regulating valves which determine the flow passage. Consequently, the larger parts can be manufactured in larger series and be kept in stock. The embodiment described has furthermore the advantage that the parts are pairwise identical.

Since the housing accommodating the distribution ducts is secured inside the turbine housing, if media of high temperature are used, complications may be produced by thermal stresses, because the medium directly comes into contact with the inner side of the housing of the centripetal stage and does not come into contact with the surrounding turbine housing. According to the invention in an effective embodiment, the housing of the first stage accommodating the distribution ducts is made from a material having a lower expansion coefficient than the material of the turbine housing and more particularly, the housing of the centripetal stage is made from austenitic nodular cast iron, whereas the turbine housing is made from ordinary cast steel. According to the invention it is also very efficient to connect the regulating valves through a narrow leakage gap with the housing of the centripetal stage without involving a direct contact. By using different materials and owing to the risk of high temperature differences in different parts a fixed connection might give rise to high thermal stresses. A flexible connection is obtainable only with difficulty. Moreover, in the event of a fixed connection a statically indefinite state would be involved. Then the various parts would be connected in two ways with each other. The use of the leakage gap permits the various parts of moving independently of each other and after a small supply of pressurized medium has leaked into the chamber between the two housings a state of equilibrium will occur in which further leakage is avoided.

If the pressurized medium is formed by vapour, the space formed between the turbine housing and the housing of the centripetal stage may, in accordance with the invention, be provided at the lowermost point with a tapping stub adapted to be closed.

According to the invention a special embodiment is obtained by providing a rectangular cross section for the distribution ducts, the passage of the housing of the regulating valves changing from the circular shape into a rectangular shape corresponding with the rectangular form of the distribution ducts. The circular shape of the passage of the housing is required for enabling a satisfactory closure in the closed state. The housing accommodating the distribution ducts can then be machined in a simple manner by mechanical means, when this housing is clamped eccentrically. Surprisingly, as compared with circular-section distribution ducts no reduction of efficiency is involved. In some cases even a slight improvement in efficiency has been found. It could be expected that the inverse would apply because a rectangular cross section has a larger "wet" surface than a circular section of the same passage.

Since the housing of the regulating valves is secured to the outer side of the turbine housing and the portion regulating the flow passage has to join the distribution channels a very long guide is required for the operating stem of the valve body. The valve body is exposed to varying pressure and shock load under the influence of the blade reaction. This might involve the risk of the valve body and the guide of the operating stem starting vibrating. According to the invention this risk can be obviated by connecting a guide sleeve for the operating stem of the valve body near the end near the valve body by means of radial ridges with the valve housing.

The invention will be described more fully hereinafter with reference to an embodiment shown in the drawing.

In the drawing:

FIG. 1 is a sectional view taken at right angles to the axis of the centripetal stage of a turbine embodying the invention, FIG. 2 is a longitudinal sectional view corresponding with that shown in FIG. 1, FIG. 3 shows a detail of FIG. 2 on an enlarged scale.

The turbine shown comprises a housing 1 accommodating a rotor 2 having stub shafts 3 and 4. The bearings and the associated packing are designated by 5 and 6. The rotor 2 comprises a centripetally traversed wheel 7 and three axial wheels 8 and 9. The housing 2 comprises stationary guide blade crowns 10 and two sets of 11 arranged in front of the axial wheels 8 and 9 respectively. The housing 1 is horizontally divided into two halves 12 and 13, which are secured to each other by means of flanges. The interior of the housing 1 formed by the two halves 12 and 13 accommodates a separate housing for the centripetal stage, which is formed by two halves 14 and 15 interconnected by means of flanges. The halves 14 and 15 are suspended in the housing 1, as is shown in FIG. 2. The interior of the housing of the centripetal stage formed by the halves 14 and 15 accommodates the distribution channels 16 and 17 having in this case a rectangular section. This is illustrated in FIGS. 2 and 3. By means of flanges 18 the half 13 of the housing 1 has secured to it a regulating valve with a housing 19. The housing 19 is provided with a supply stub 20. The housing 19 comprises a guide sleeve 21 for a valve stem 22 bearing a valve body 23. The valve body 23 co-operates with a replaceable part 24 arranged in the housing 19. The valve body 23 and the part 24 determine the passage of the regulating valve and are dimensioned so that in the open state of the valve body 23 a very high speed of the medium supplied to the regulating valve is attained. The half 12 of the housing 1 has secured to it a correspondingly shaped regulating valve having a housing 25. The various parts of the latter valve are not shown in detail. The guide sleeve 21 for the valve stem 22 is connected with the housing 19 by means of radial ridges 26. A direct contact is not established between the exchangeable part 24 and the part 15 of the housing of the centripetal stage since a gap 27 is formed. The space 28 between the housing 1 and the housing 14, 15 of the centripetal stage communicates through the gap 27 with the pressurized medium supply for driving the turbine. If a condensable medium is used, the space 28 is provided with a tapping stub 29, which can be closed. Drainage of condensate is particularly important in regard of taking the turbine into operation, since in this case no fluid must be found in the channels:

Owing to the bipartite structure and the separate housing of the centripetal stage and the exchangeable part of the regulating valve adaptation to given conditions is possible whilst maintaining the same dimensions of the housings 19 and 25 of the regulating valve and of the halves 12 and 13 of the turbine housing by using a different housing 14, 15 and a different exhangeable part 24. Consequently the heavy parts may be manufactured in large series and be kept on stock. Since in the event of a medium of high temperature, for example, high-pressure steam, complications may be produced by thermal stress, the housing 14,15 may be made from a material of different expansion coefficient than the housing 1. For example, the turbine housing 1 may be made from cast steel, whereas the housing 14,15 may be made from austenitic, nodular cast iron. Owing to the gap 27 between the exchangeable part 24 and the housing 14,15 of the centripetal stage the thermal stresses involved are also restricted. A particularly simple connection is thus obtained since the space 28 may be a closed space. It is an additional advantage that medium leaking through the gap 27 has already experienced a great drop in pressure so that the housing 1 need not be resistant to high pressure. The distribution channels 16 and 17 have a rectangular section so that very simple machining can be carried out when the two housing halves 14 and 15 are clamped eccentrically. The replaceable part 24 has a transition from the circular section at the area of the closing part of the valve body 23 to the rectangular section at the area of the junction with the distribution channel 17. The circular section of the replaceable part 24 of the housing is required for ensuring a satisfactory closure of the valve in the closed state. The structural form chosen for the turbine requires the use of a very long guide for the valve stem 22. Owing to the supporting ridges 26 the valve body 23 and the guide sleeve 21 are prevented from vibrating in the event of varying pressure and shock loads. Such varying loads are likely to occur readily due to the reaction of the blades of the wheel 7 on the valve body 23.

What I claim is:

1. A turbine using a compressible medium and having one or more wheels, among which at least the wheel of the first stage is traversed in a centripetal direction by the driving medium and operates in accordance with the equal-pressure principle, said stage being surrounded by one or more distribution ducts arranged around the centripetal wheel, while one or more regulating valves in which an entalpy difference of the medium is converted into velocity is (are) connected by the outlet opening directly with the inlet side of the distribution duct(s) and viewed from the inlet end the distribution duct(s) exhibit(s) gradually decreasing flow passage and join directly the centripetal wheel along the whole inner circumference characterised in that the horizontally divided turbine housing has secured in its interior the equally horizontally divided housing of the centripetal stage accommodating the distribution ducts, in that each of the halves of the turbine housing has secured to it a housing of a regulating valve and in that in each regulating valve the portion of the housing which determines the flow passage along the valve body is constructed to form a replacable part, characterised in that the regulating valves communicate through a narrow leakage gap with the housing of the centripetal stage without a direct contact being established.

2. A turbine as claimed in claim 1 characterised in that the space formed between the turbine housing and the housing of the centripetal stage is provided at the lowermost point with a tapping stub which can be closed.

3. A turbine as claimed in claim 1 characterised in that the distribution ducts have a rectangular section and in that the passage of the housing of the regulating valves changes from a circular shape into a rectangular shape corresponding with the shape of the distribution ducts.

4. A turbine as claimed in claim 1 characterised in that a guide sleeve for the control-stem of the valve body is connected with the valve housing at the end near the valve body by means of radial ridges.

5. A turbine as claimed in claim 2 characterised in that the distribution ducts have a rectangular section and in that the passage of the housing of the regulating valves changes from a circular shape into a rectangular shape corresponding with the shape of the distribution ducts.

6. A turbine as claimed in claim 2 characterised in that a guide sleeve for the control-stem of the valve body is connected with the valve housing at the end near the valve body by means of radial ridges.

7. A turbine as claimed in claim 5 characterised in that a guide sleeve for the control-stem of the valve body is connected with the valve housing at the end near the valve body by means of radial ridges.

8. A turbine as claimed in claim 3 characterised in that a guide sleeve for the control-stem of the valve body is connected with the valve housing at the end near the valve body by means of radial ridges.

9. A turbine assembly comprising, in combination:
   a turbine shaft having a centripetal turbine wheel having centripetal blades on at least one side of said wheel;
   a turbine housing journalling said turbine shaft and including a housing portion circumferentially enclosing said centripetal turbine wheel;
   a centripetal stage housing fixed within said housing portion and defining a closed space between said housing portion and said centripetal stage housing, said centripetal stage housing having an inlet opening aligned essentially tengentially with respect to said centripetal turbine wheel and presenting an inlet duct of decreasing cross section from said inlet opening circumferentially of said turbine wheel;

a valve housing assembly secured to said housing portion and including a valve seat portion defining a constricted passage leading to said inlet opening of the centripetal stage housing, and said valve housing assembly also including a working fluid inlet conduit portion communicating with said constricted passage; and a valve shiftable within said valve seat portion to control the flow of working fluid into said inlet duct of the centripetal stage housing;

said valve seat portion extending into close proximity to but being spaced from said housing portion of the centripetal stage housing whereby to permit thermal expansion of the centripetal stage housing without interference from said valve seat portion while providing a gap which allows working fluid to enter said closed spaced and equalize the pressure therein with the working fluid pressure in said inlet duct of the centripetal stage housing.

10. A turbine assembly as defined in claim 9 wherein each said turbine housing and said centripetal stage housing are formed of upper and lower halves which are separated along a common, horizontal parting plane.

11. A turbine assembly as defined in claim 9 wherein said valve housing assembly is separate from and removably secured to said turbine housing, said valve seat portion being separate from and removably secured to said valve housing assembly.

12. A turbine assembly as defined in claim 10 wherein said valve housing assembly is separate from and removably secured to said turbine housing, said valve seat portion being separate from and removably secured to said valve housing assembly.

13. A turbine assembly as defined in claim 9 wherein said turbine wheel is provided with centripetal blades on either side thereof, said housing portion having cylindrical recesses concentric with said turbine shaft and disposed on opposite sides of said turbine wheel, and said centripetal stage housing having oppositely projecting opposite side bosses fitted within said recesses.

14. A turbine assembly as defined in claim 13 wherein said valve housing assembly is separate from and removably secured to said turbine housing, said valve seat portion being separate from and removably secured to said valve housing assembly.

15. A turbine assembly as defined in claim 10 wherein said turbine wheel is provided with centripetal blades on either side thereof, said housing portion having cylindrical recesses concentric with said turbine shaft and disposed on opposite sides of said turbine wheel, and said centripetal stage housing having oppositely projecting opposite side bosses fitted within said recesses.

16. A turbine assembly as defined in claim 15 wherein said valve housing assembly is separate from and removably secured to said turbine housing, said valve seat portion being separate from and removably secured to said valve housing assembly.

* * * * *